United States Patent [19]
Im

[11] Patent Number: 5,445,213
[45] Date of Patent: Aug. 29, 1995

[54] HEAT ACCUMULATOR FOR HEAT ENERGY AND COLD ENERGY ACCUMULATING SYSTEM

[75] Inventor: Jong-Sung Im, Suwon-city, Rep. of Korea

[73] Assignee: Samsung Electronics Co., Ltd., Suwon City, Rep. of Korea

[21] Appl. No.: 255,964

[22] Filed: Jun. 7, 1994

[30] Foreign Application Priority Data

Jun. 7, 1993 [KR] Rep. of Korea ............... 93-10231

[51] Int. Cl.$^6$ ..................... F28D 19/00; F25D 3/00
[52] U.S. Cl. ........................................ 165/10; 62/59; 62/438
[58] Field of Search ................ 165/10, 104.11; 62/59, 62/430, 438

[56] References Cited

U.S. PATENT DOCUMENTS

| | | |
|---|---|---|
| 2,521,272 | 9/1950 | Williams ................................. 62/59 |
| 2,703,480 | 3/1955 | Riemenschneider ................. 62/438 |

FOREIGN PATENT DOCUMENTS 2210961  6/1989  United Kingdom ............... 165/10

*Primary Examiner*—A. Michael Chambers
*Attorney, Agent, or Firm*—Burns, Doane, Swecker & Mathis

[57] ABSTRACT

A heat accumulator for a heat energy and cold energy accumulating system. This system comprises a plurality of heat accumulator units coupled to each other in series or in parallel by a heat exchanging pipe. The heat accumulator units may be charged with phase change materials of different melting points. Alternatively, the heat accumulator units may be charged with phase change materials of the same melting point. When phase change materials of the same melting point are charged in the accumulator units, the accumulator units are provided with respective pressure controllers in order to be able to vary the respective melting points of the phase change materials.

4 Claims, 5 Drawing Sheets

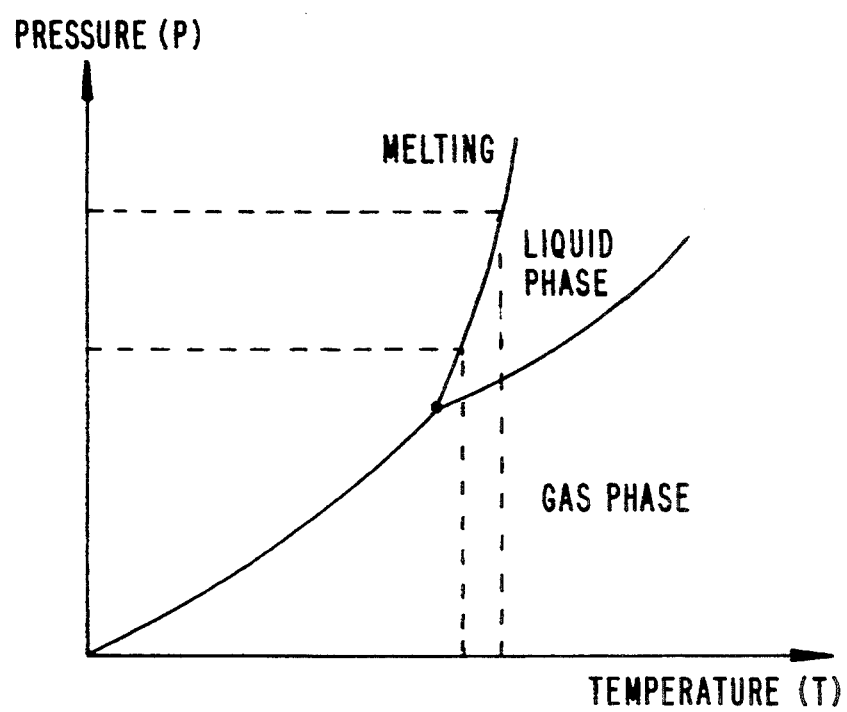

HEAT ACCUMULATOR FOR HEAT ENERGY AND COLD ENERGY ACCUMULATING SYSTEM

BACKGROUND OF THE INVENTION

1. Field of the Invention

The present invention relates in general to energy accumulating systems for accumulating heat energy or cold energy using surplus electric power and using the accumulated energy in later heating operation or cooling operation and, more particularly, to an improved structure in heat accumulators of such energy accumulating systems using latent heat generated in phase changing of a phase change material (PCM) such as water or polyethylene glycol.

2. Description of the Prior Art

As well known to those skilled in the art, the energy accumulating systems for accumulating heat energy or cold energy are equipped with heat accumulators. In a typical energy accumulating system, the heat energy or the cold energy is accumulated in the heat accumulator using cheap night time electric power. The accumulated energy is, thereafter, used in heating or cooling operation in the daytime.

With reference to FIG. 1, there is shown a typical energy accumulating system having a conventional heat accumulator.

In a cold energy accumulating operation of the system, gaseous refrigerant of high pressure and high temperature which was compressed by a compressor 1 is introduced into a condenser 3 wherein the gaseous refrigerant will be cooled in order to become liquid refrigerant. That is, the refrigerant is subjected to heat exchanging in the condenser 3 so as to be changed in its phase from gas to liquid.

The liquid refrigerant, thereafter, passes through an expansion valve 5 so as to be reduced in its pressure and temperature. The liquid refrigerant of low pressure and low temperature is in turn introduced via conduit 7 into a first heat exchanger 9, which functions as an evaporator. The refrigerant is, thereafter, introduced into the compressor 1.

At this time, the refrigerant passing through the refrigerant conduit 7 absorbs the heat from a heat exchanging pipe 11 of the first heat exchanger 9 before it is introduced into the compressor 1.

Therefore, the refrigerant passing through the heat exchanging pipe 11 exchanges the heat with the refrigerant passing through the refrigerant conduit 7 so that the temperature of the refrigerant in pipe 11 falls. The low temperature refrigerant in the heat exchanging pipe 11 exchanges heat with a phase change material in a heat accumulator 13, thus to be increased in its temperature and to become high temperature refrigerant. The high temperature refrigerant is, thereafter, introduced back into the first heat exchanger 9.

The heat exchanging pipe 11 passing through the heat accumulator 13 is zigzagged or coiled in its profile so as to achieve the desired heat exchanging effect. The phase change material is selected from water, polyethylene glycol and the like. The phase change material absorbs the cold from the heat exchanging pipe 11, thus to be changed in phase from liquid to solid and to accumulate cold energy therein.

In a cooling operation of the system, a phase change material is introduced in liquid phase into the heat accumulator 13 through a lower heat accumulator pipe 15. That liquid phase of the phase change material melts a solid phase of the phase change material disposed about the heat exchanging pipe 11 while passing through the accumulator 13.

That is, the liquid phase of the phase change material inside the lower heat accumulator pipe 15 exchanges heat with the solid phase of the phase change material which is frozen about the heat exchanging pipe 11, thus to become a cool refrigerant. Here, the solid phase of the phase change material was changed in phase from liquid to solid by the above-described cold energy accumulation.

The cool refrigerant or the phase change material is pumped by a pump 19 and supplied to a second heat exchanger 21 through a heat accumulator pipe 17 so as to be used in the cooling operation as follows.

As shown in FIG. 1, since both an upper heat accumulator pipe 20 and a cooling coil pipe 23 pass through the second heat exchanger 21 adjacent to each other, the cool refrigerant or the cool phase change material in the upper heat accumulator pipe 20 exchanges heat with a refrigerant in the cooling coil pipe 23, thus reducing the temperature of the refrigerant in the cooling pipe 23.

The low temperature refrigerant in the cooling coil pipe 23 is in turn introduced into a cooling coil pipe 25 wherein the refrigerant absorbs the outside heat. Thereafter, the refrigerant is pumped by a pump 27 so as to be introduced into a cooler 29 wherein the refrigerant is subjected to heat exchanging. This refrigerant after the heat exchanging in the cooler 29 is in turn introduced into the second heat exchanger 21.

Meanwhile, when the refrigerant circulating passage in order of the compressor 1, the condenser 3, the expansion valve 5 and the first heat exchanger 9 is reversed, the above heat accumulating system will carry out a heating operation. At this time, the phase change material in the heat accumulator 13 should be substituted with another phase change material suitable for used in the heating operation.

The above heat energy and cold energy accumulating system is provided with one heat accumulator which is commonly used in both the heating operation and the cooling operation while changing the type of phase change material used in the accumulator when switching between heating and cooling operations.

However, the above energy accumulating system has a shortcoming. That is, the temperature difference between the heat exchanging pipe 11 and the phase change material located about the pipe 11 in the heat accumulator 13 is relatively large so that much of the energy available for exchange is not able to be exchanged. Such a high loss of the potential heat exchanging limits both the heat transferring efficiency and the thermodynamic efficiency during both the heat energy accumulation and the cold energy accumulation. In this regard, the heat accumulator should be enlarged in its size in order to achieve the desired operational efficiency.

Furthermore, it is very difficult to extract a desired amount of energy from the above energy accumulating system.

Another problem of the above energy accumulating system is that the phase change material in the heat accumulator can not be commonly used in both the heating operation and the cooling operation but must be replaced by another phase change material whenever the operation is altered between the heating operation and the cooling operation. This is caused by the fact that the phase change material used in the heat energy accumulation should have a different melting point than the phase change material used in the cold energy accumulation.

SUMMARY OF THE INVENTION

It is, therefore, an object of the present invention to provide a heat accumulator for a heat energy and cold energy accumulating system in which the aforementioned problems can be overcome and which comprises a plurality of heat accumulator units, which units are charged with different phase change materials of different melting points and coupled to each other in series or in parallel and optionally selected to be used as desired, thus to not only improve the system efficiency but also facilitate the control of the system.

It is another object of the present invention to provide a heat accumulator for a heat energy and cold energy accumulating system whose plurality of heat accumulator units are coupled to each other in series and charged with different phase change materials of different melting points and which causes the difference between the mean temperature of the phase change materials in the accumulator units and the mean temperature of the refrigerant in the heat exchanging pipe to be reduced, thus to minimize the loss of heat exchanging between the phase change materials and the heat exchanging pipe and to achieve a desired high efficiency of the system.

It is a further object of the present invention to provide a heat accumulator for a heat energy and cold energy accumulating system which includes a pressure controller provided in each heat accumulator unit for controlling the pressure of the heat accumulator unit and making the phase change materials of the heat accumulator units to have different melting temperatures and selects a predetermined temperature of the heat accumulator unit in an operation, thus to be easily control the operation of the system.

The above objects can be achieved by providing a heat accumulator for a heat energy and cold energy accumulating system, the accumulator comprising a plurality of heat accumulator units charged with phase change materials of the same melting point and coupled to each other in parallel by a heat exchanging pipe, the heat exchanging pipe passing thought all the accumulator units.

In another embodiment, the present invention provides a heat accumulator for a heat energy and cold energy accumulating system, the accumulator comprising a plurality of heat accumulator units charged with phase change materials of the same melting point and coupled to each other in parallel by a heat exchanging pipe, the heat exchanging pipe passing thought all the accumulator units and the heat accumulator units being provided with their respective pressure controllers.

In a further embodiment, the present invention provides a heat accumulator for a heat energy and cold energy accumulating system comprising a plurality of heat accumulator units charged with phase change materials of different melting points and coupled to each other in series by a heat exchanging pipe, the heat exchanging pipe passing thought all the accumulator units.

In still another embodiment, the present invention provides a heat accumulator for a heat energy and cold energy accumulating system comprising a plurality of heat accumulator units charged with phase change materials of different melting points and coupled to each other in series by a heat exchanging pipe, the heat exchanging pipe passing thought all the accumulator units and the heat accumulator units being provided with their respective pressure controllers.

In accordance with an heat accumulator of the present invention, a desired amount of energy is extracted from the accumulator units, thus to improve the system efficiency. The heat accumulator units may be charged with the phase change materials of different melting points. Alternately, the accumulator units may be charged with the phase change materials of the same melting point and, at the same time, provided with pressure controllers for making the melting points of the phase change materials differing from each other. In this regard, the system alters its operation between the heating operation and the cooling operation without changing the phase change material unlike the prior art.

BRIEF DESCRIPTION OF THE DRAWINGS

The above and other objects, features and other advantages of the present invention will be more clearly understood from the following detailed description taken in conjunction with the accompanying drawings, in which:

FIG. 6 is a PT characteristic curve diagram showing pressure P of a phase change material of the present invention as a function of temperature T of the phase change material.

DESCRIPTION OF THE PREFERRED EMBODIMENTS

Figure 1:
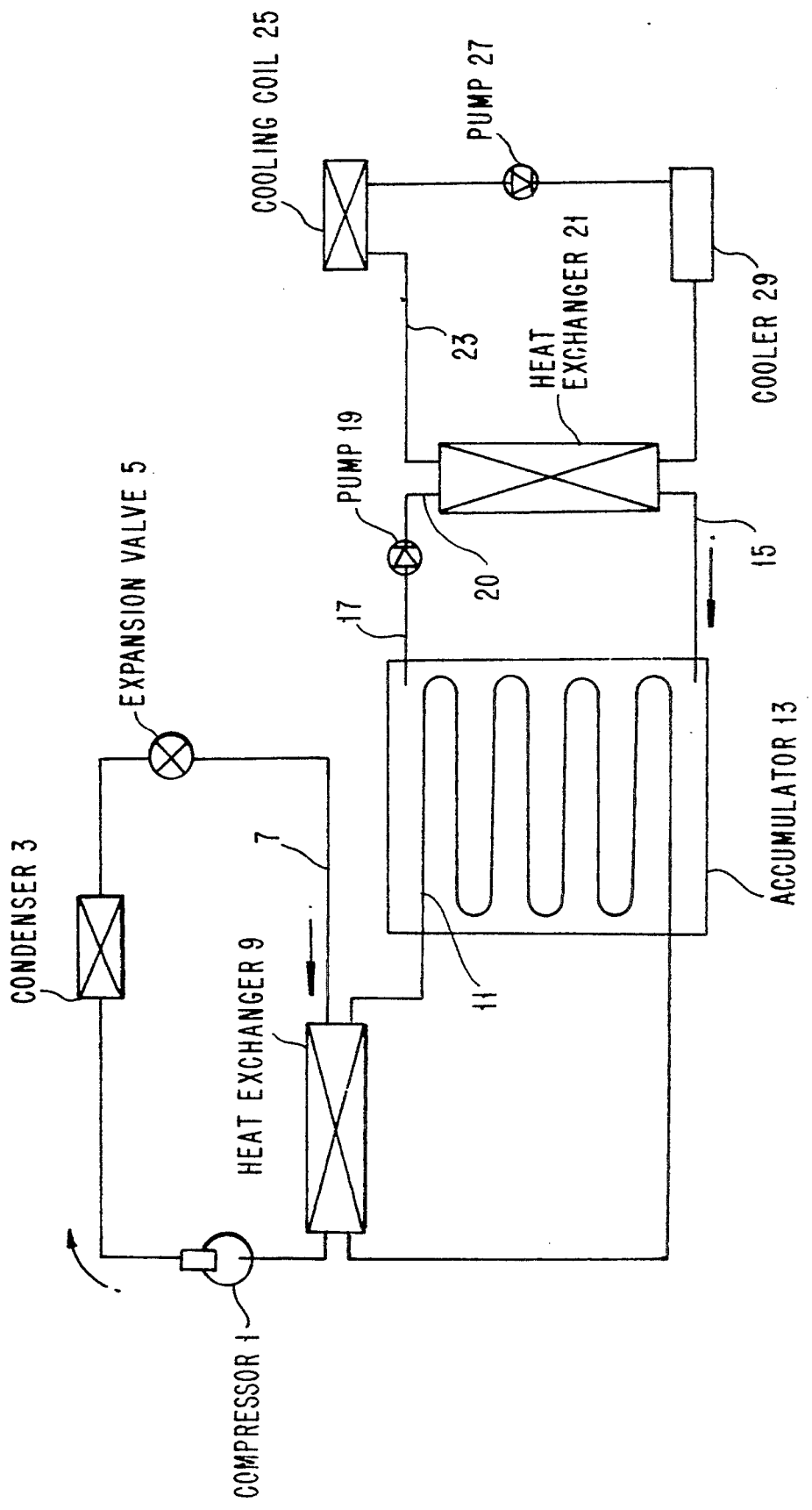
FIG. 1 is a circuit diagram of a prior art heat energy and cold energy accumulating system having a typical heat accumulator.
Figure 2:
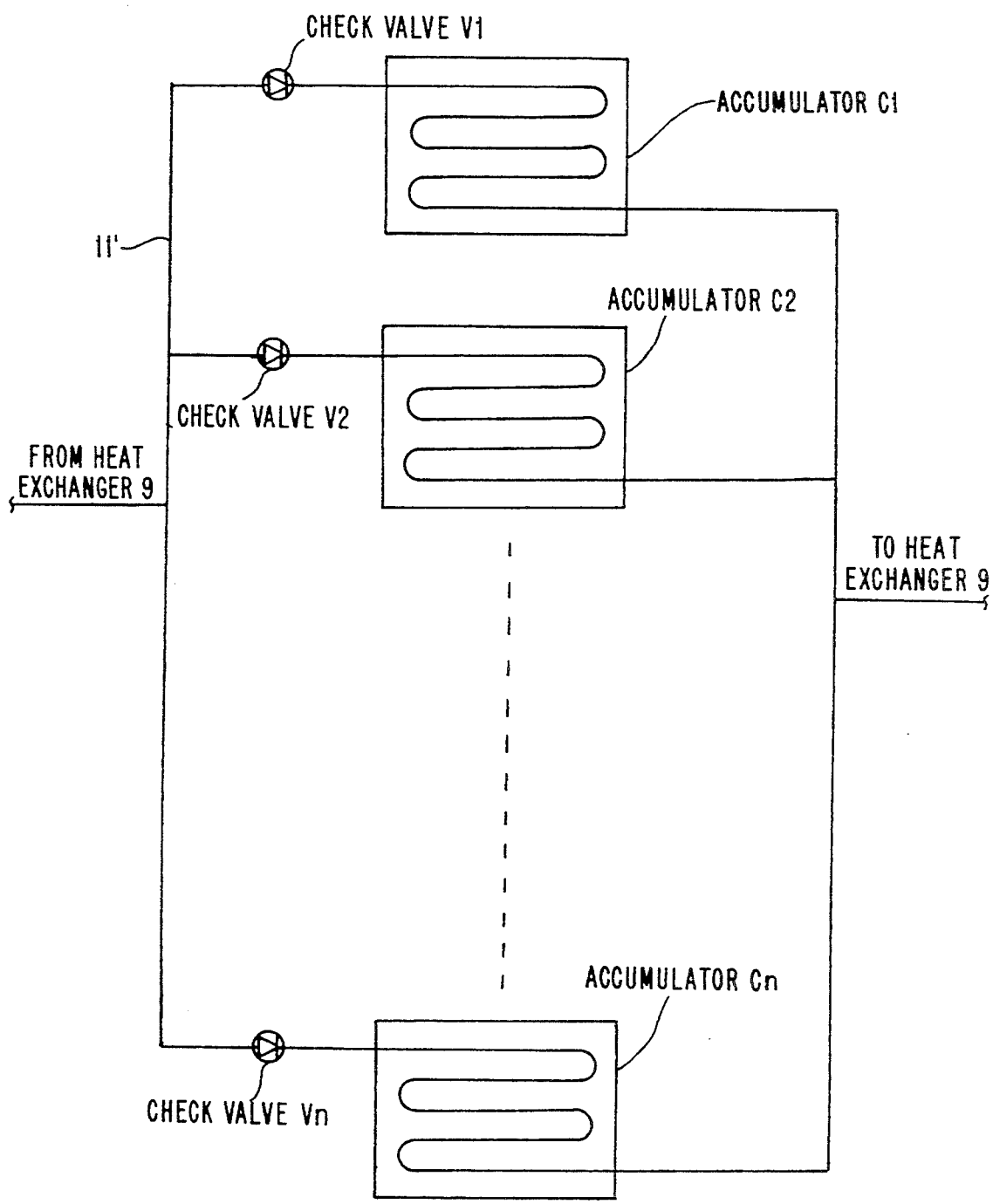
FIG. 2 is a schematic view of a plurality of heat accumulator units charged with phase change materials of the same melting point and coupled to each other in parallel in accordance with an embodiment of the present invention.

With reference to FIG. 2, there is shown in a circuit diagram of a heat accumulator comprising a plurality of accumulator units C1 to Cn charged with phase change materials of the same melting point and coupled to each other in parallel in accordance with an embodiment of the present invention.

As shown in this drawing, a heat exchanging pipe 11' passes through all the accumulator units C1 to Cn coupled to each other in parallel. A check valve V1 to Vn is provided on the heat exchanging pipe 11' in front of each accumulator unit for controlling flow of refrigerant into the accumulator unit.

The check valves V1 to Vn enable a desired amount of accumulated energy to be extracted from the heat accumulator in accordance with opening or closing of the check valves.

Figure 3:
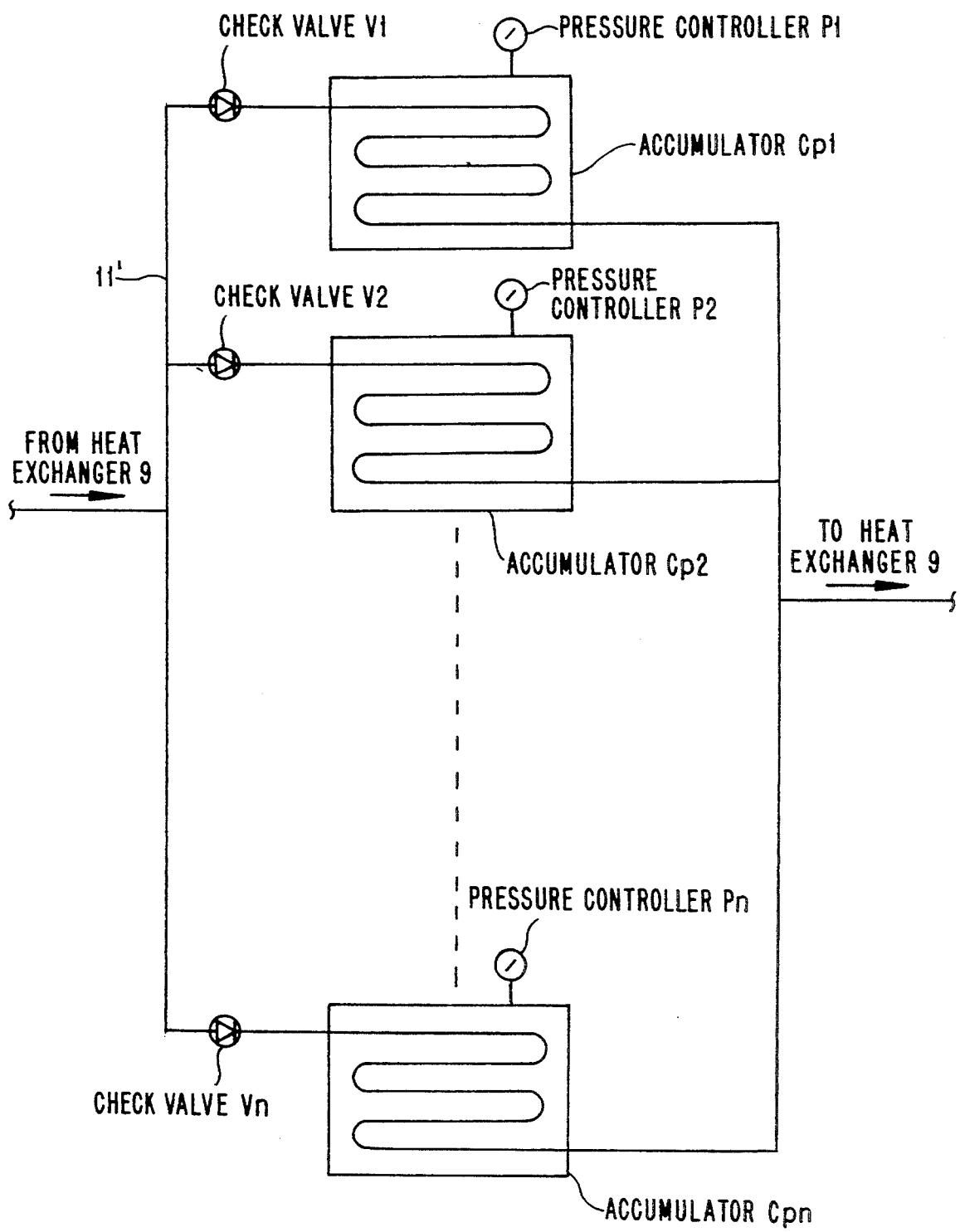
FIG. 3 is a schematic view of the plurality of heat accumulator units of FIG. 2, the accumulator units having their respective pressure controllers.

FIG. 3 shows a heat accumulator comprising a plurality of accumulator units Cp1–Cpn which are charged with the phase change materials of the same melting point and coupled to each other in parallel as described FIG. 2. However, these accumulator units Cp1–Cpn have respective pressure controllers P1–Pn.

As shown in FIG. 6 showing a PT characteristic curve diagram, the melting point T of a phase change material charged in an accumulator unit varies in proportion to pressure P.

In accordance, when the pressures P of the accumulator units Cp1–Cpn are controlled by the pressure controllers P1–Pn, the accumulator units become different from each other as to the melting point temperatures T therein. By causing the melting point temperatures T of the accumulator units Cpx to differ from each other, a predetermined temperature of refrigerant exiting each accumulator unit can be selected so that the energy accumulating system is easily controlled in its operation.

For example, the pressures of the accumulator units are controlled by the pressure controllers respectively in such a manner that the first accumulator unit Cp1 has the highest pressure but the last accumulator unit Cpn has the lowest pressure. In this case, phase change materials of the same melting point charged in the accumulator units have their melting temperatures changed in response to variation of the pressures in the accumulator units and thus function therein as phase change materials of different melting points.

Of course, when the phase change materials of the same melting points charged in the accumulator units of FIG. 2 are replaced by phase change materials of different melting points, the same result as in the embodiment of FIG. 3 will occur in FIG. 2.

Figure 4:
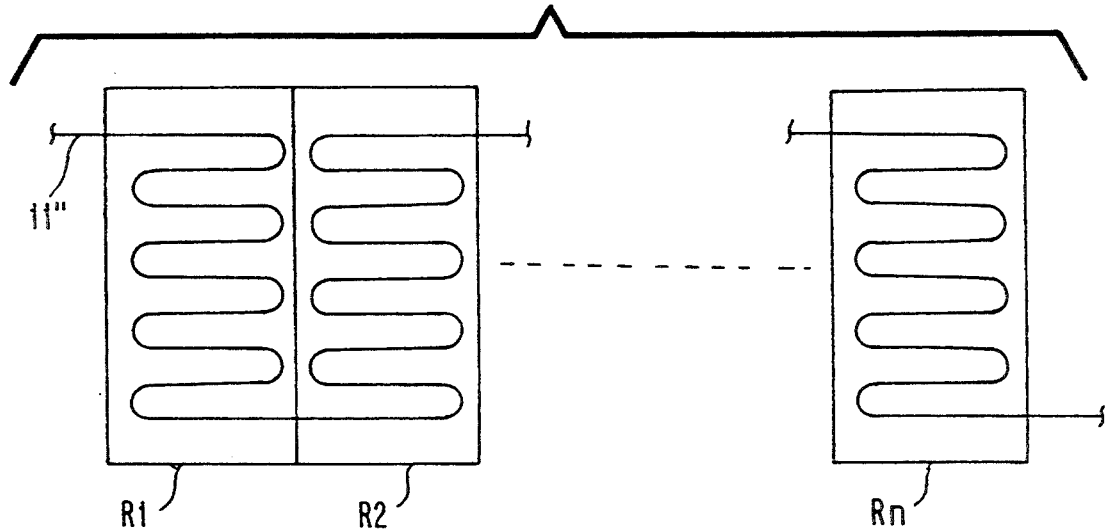
FIG. 4 is a schematic view of a plurality of heat accumulator units charged with phase change materials of different melting points and coupled to each other in series in accordance with another embodiment of the present invention.

Turning to FIG. 4, there is shown a plurality of heat accumulator units R1 to Rn charged with phase change materials of different melting points and coupled to each other in series in accordance with another embodiment of the present invention. In this case, a heat exchanging pipe 11″ passes through all the accumulator units coupled to each other in series. The phase change materials of different melting points may be charged in the accumulator units in such a manner that a phase change material of the lowest melting point is charged in the first accumulator unit R1, and a phase change material of the highest melting point is charged in the last accumulator unit Rn. Alternatively, the charging order of the phase change materials of different melting points may be reversed. That is, the phase change materials of different melting points may be charged in the accumulator units in such a manner that the phase change material of the highest melting point is charged in the first accumulator unit R1, and the phase change material of the lowest melting point is charged in the last accumulator unit Rn.

In this case, the difference between the mean temperature of the phase change materials in the accumulator units and the mean temperature of the refrigerant in the heat exchanging pipe 11″ is reduced. This minimizes the loss of heat exchanging between the phase change materials and the heat exchanging pipe 11″, thus to improve the thermal efficiency of the system.

Figure 5:
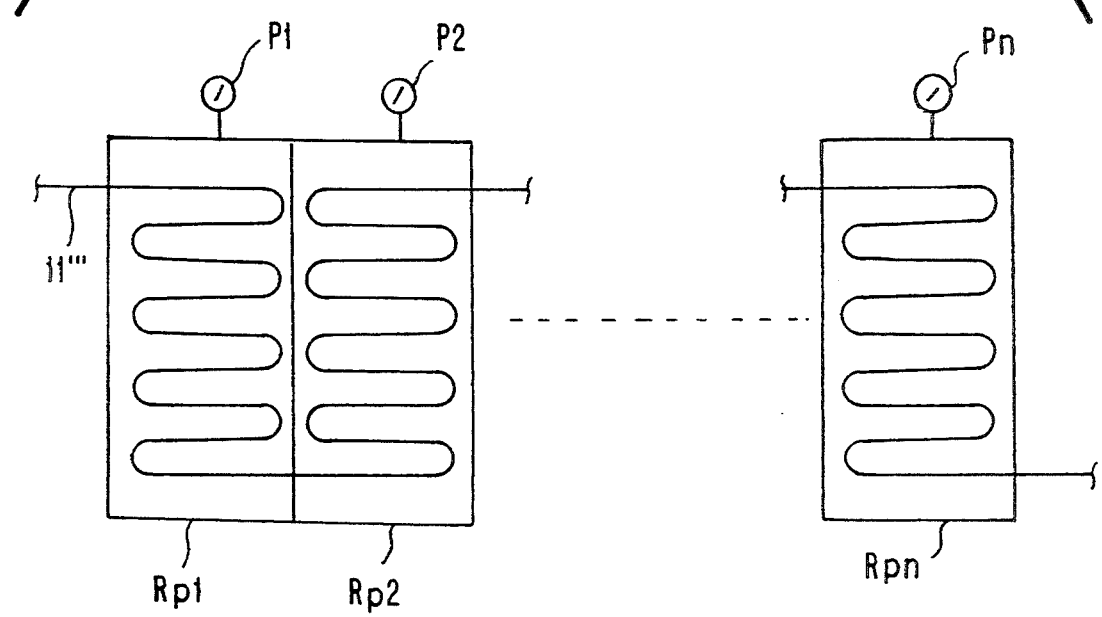
FIG. 5 is a circuit diagram of a plurality of heat accumulator units charged with phase change materials of the same melting point and having their respective pressure controllers and coupled to each other in series in accordance with the present invention.

FIG. 5 is a circuit diagram of a plurality of heat accumulator units Rp1 to Rpn coupled to each other in series in the same manner as described for the embodiment of FIG. 4. However, the accumulator units of FIG. 5 are charged with the phase change materials of the same melting point and have respective pressure controllers P1 to Pn unlike the accumulator units Rx of FIG. 4. This embodiment of FIG. 5 uses the fact that melting points T of the phase change materials charged in the accumulator units become different from each other when the pressures of the phase change materials are changed by the pressure controllers as described for the embodiment of FIG. 3.

For example, the pressures of the accumulator units Rp1 to Rpn are controlled by the pressure controllers P1 to Pn respectively in such a manner that the lowest pressure is applied to the first accumulator unit Rp1 by the first pressure controller P1 but the highest pressure is applied to the last accumulator unit Rpn by the last pressure controller Pn. In this case, the first accumulator unit Rp1 functions as if it was charged with a phase change material of the lowest melting point while the last accumulator unit Rpn functions as if it was charged with a phase change material of the highest melting point.

However, it should be understood that the pressures of the accumulator units Rp1–Rpn may be controlled in reversed manner. That is, the pressures of the accumulator units may be controlled by the pressure controllers respectively in such a manner that the lowest pressure is applied to the last accumulator unit Rpn by the last pressure controller Pn but the highest pressure is applied to the first accumulator unit Rp1 by the first pressure controller P1.

When the pressures of the accumulator units Rp1–Rpn, which accumulator units Rpx are charged with the phase change materials of the same melting point and coupled to each other in series, are changed under the control of the pressure controllers as described above, the result expected when the accumulator units are charged with the phase change materials of the different melting points is yielded.

That is, the embodiment of FIG. 5 minimizes the heat exchanging loss in the same manner as described for the embodiment of FIG. 4, thus to improve the thermal efficiency of the system.

As described above, a heat accumulator for a heat energy and cold energy accumulating system in accordance with the present invention comprises a plurality of heat accumulator units which are coupled to each other in series or in parallel. The heat accumulator units may be charged with the phase change materials of different melting points regardless of their coupling type. Alternatively, the heat accumulator units may be charged with the phase change materials of the same melting point. When the phase change materials of the same melting point are charged in the accumulator units, the accumulator units should be provided with their respective pressure controllers. In the heat accumulator of the present invention, a predetermined temperature of the refrigerant passing through a given accumulator unit is selected by means of an appropriate selection of the melting point temperature of the phase change material in that accumulator. Thus, the thermal efficiency of the system is improved. In addition, the heat accumulator minimizes the loss of heat exchanging between the heat exchanging pipe and the phase change materials. Another advantage of the present invention is that the system alternately carries out the heating operation and the cooling operation without replacing the phase change materials.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A heat accumulator assembly for a thermal energy accumulating system, comprising:

a plurality of thermal accumulator units, each charged with a phase change material; and a heat exchanging pipe arrangement passing through said accumulator units in parallel relationship for conducting refrigerant;

each accumulator unit having a pressure controller varying the pressure and melting temperature of the phase change material disposed therein such that the phase change materials in the respective accumulators have different melting temperatures from each other.

2. The heat accumulator assembly according to claim 1, wherein the same phase change material is provided in each accumulator unit.

3. A heat accumulator assembly for a thermal energy accumulator system, comprising:

a plurality of thermal accumulator units charged with different phase change materials; and a heat exchanging pipe arrangement passing through said units in series relationship for conducting refrigerant, whereby a temperature of refrigerant in said pipe is gradually changed while traveling serially through said accumulator units;

said phase change materials in said accumulator units having progressively different melting temperatures so as to minimize the temperature difference between said refrigerant and phase change material in each unit.

4. The heat accumulator assembly according to claim 3, wherein each accumulator unit has a pressure controller for varying the pressure and melting temperature of the phase change material disposed therein.

* * * * *